May 30, 1933.   S. W. MATHIAS   1,912,340
FEEDING MECHANISM FOR SCREW THREADING MACHINES
Original Filed Nov. 28, 1927    3 Sheets-Sheet 2
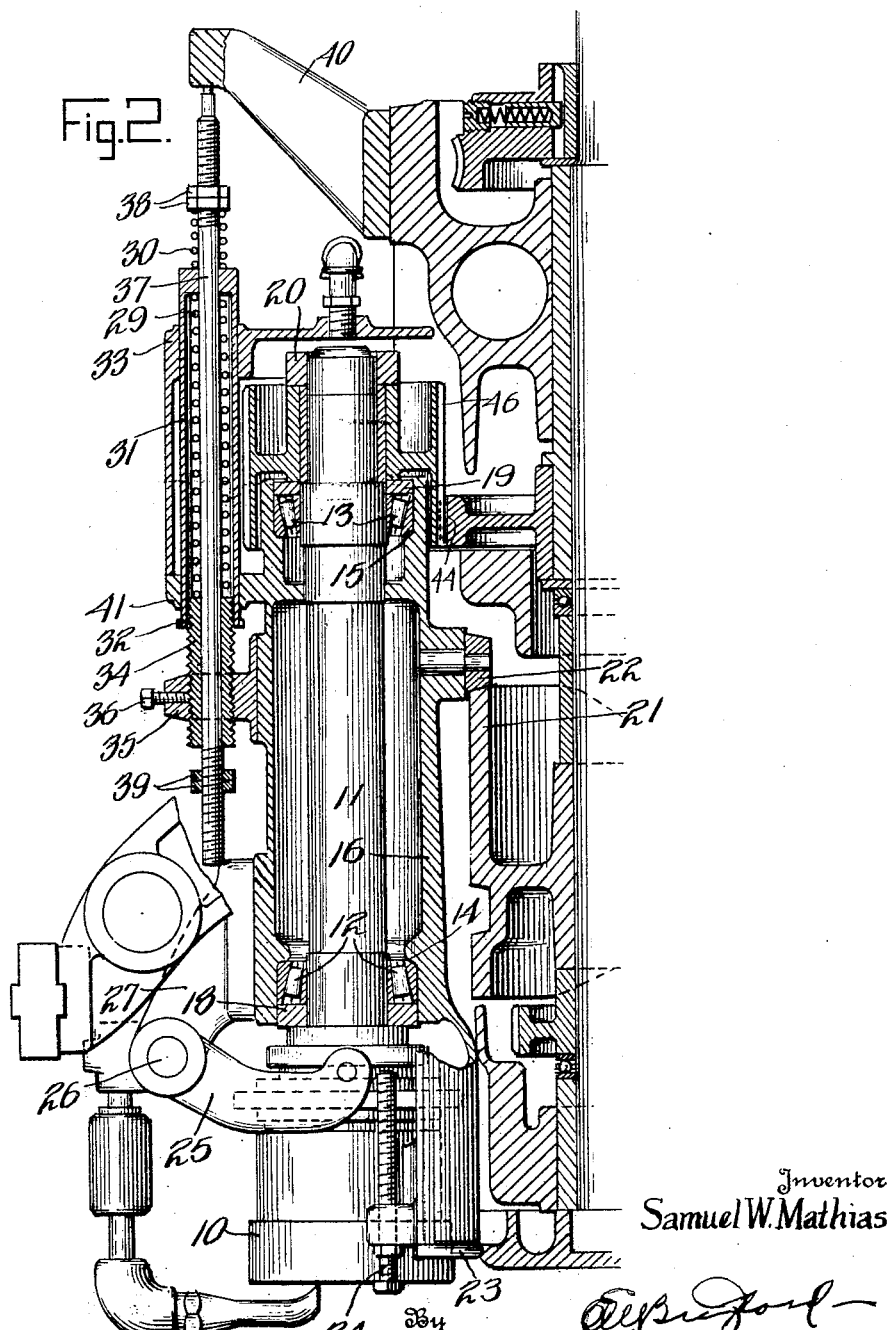
Inventor
Samuel W. Mathias

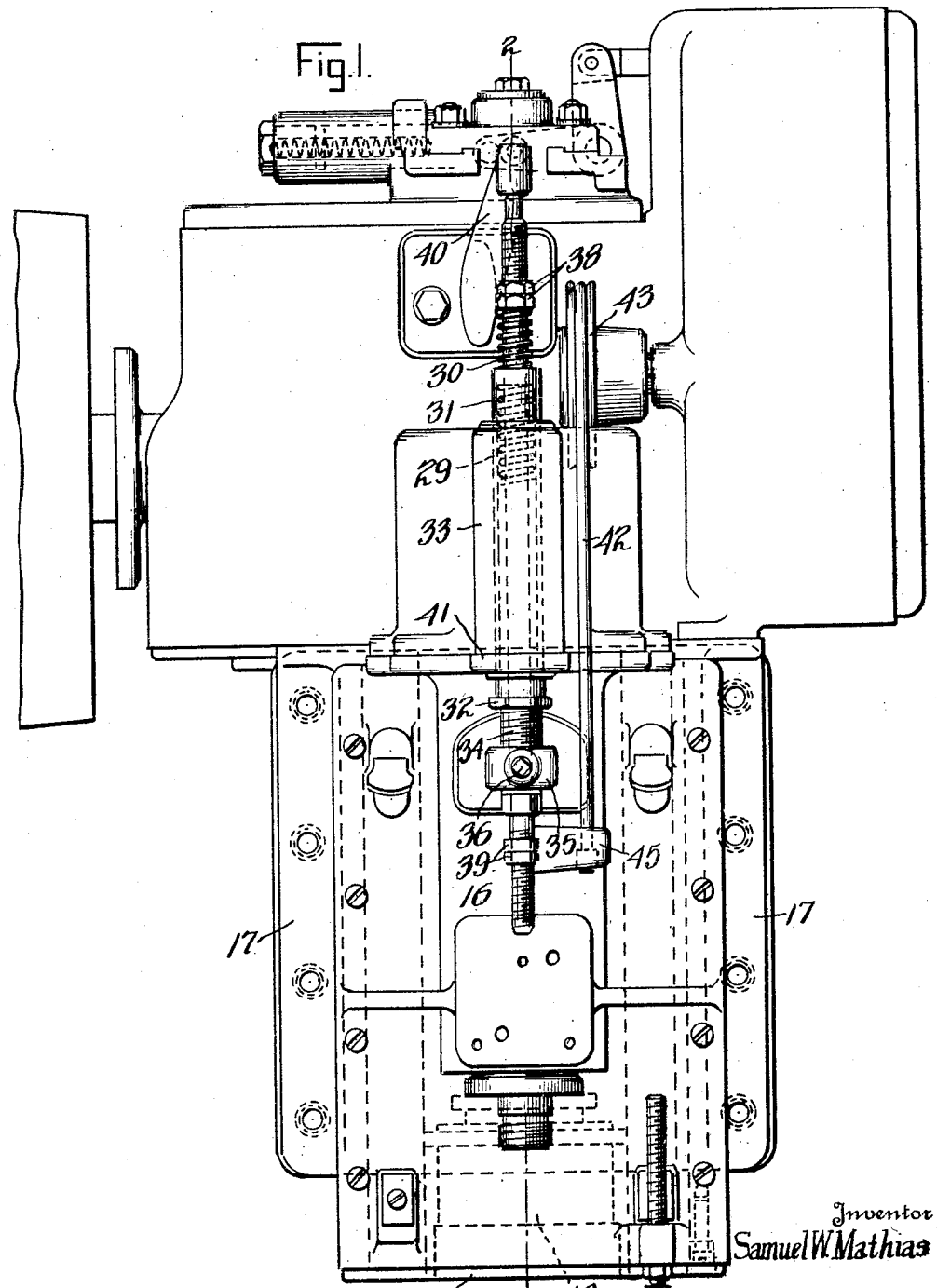

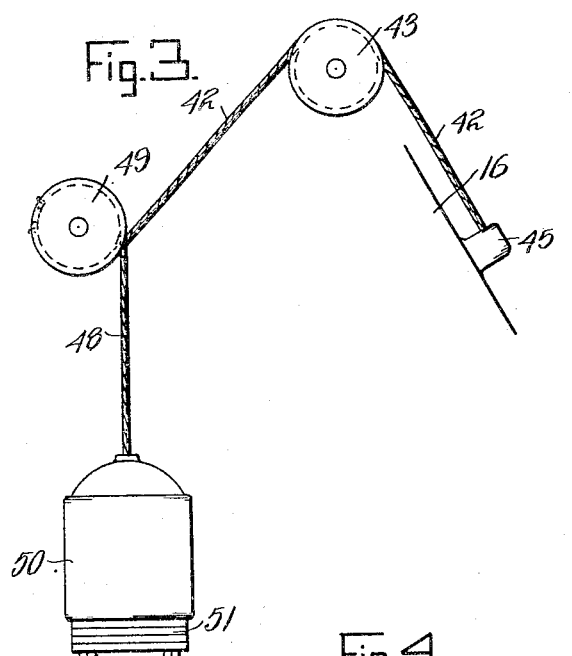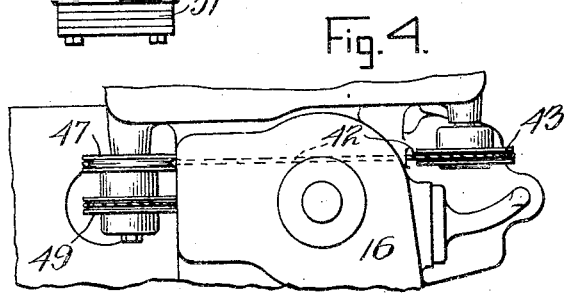

Patented May 30, 1933

1,912,340

UNITED STATES PATENT OFFICE

SAMUEL W. MATHIAS, OF WAYNESBORO, PENNSYLVANIA, ASSIGNOR TO LANDIS MACHINE COMPANY, OF WAYNESBORO, PENNSYLVANIA, A CORPORATION OF PENNSYLVANIA

FEEDING MECHANISM FOR SCREW THREADING MACHINES

Original application filed November 28, 1927, Serial No. 236,258. Divided and this application filed July 13, 1929. Serial No. 378,056.

This invention relates to feeding mechanism for a threading die head in screw threading machines, and is a division of my co-pending application Serial No. 236,258, filed November 28, 1927, for Forming and threading machines.

An object of this invention is to provide improved means for starting a threading die head upon the work. Other objects will become apparent as the invention is described in the specification.

Referring to the accompanying drawings, which are made a part hereof, and on which similar reference characters indicate similar parts, Figure 1 is a view in elevation of my device as applied to a threading die head, Figure 2 is a vertical section on line 2—2 of Fig. 1, Figure 3 is a side view of a part of the die head balancing mechanism, and Figure 4 is a plan view of a portion of the balancing mechanism.

In the drawings numeral 10 indicates a threading die head which is screwed on the end of a spindle 11. This spindle is carried by tapered roller bearings 12 and 13 which are fixed between shoulders 14 and 15 in a threading slider 16 which is mounted to slide in suitable slideways on the frame 17 of the machine. The spindle carries protecting flanges 18 and 19 which are pressed thereon to prevent the entrance of dirt to the bearings, and also to prevent leakage of lubricant from the bearings. The outside diameter of these flanges is slightly less than the bore in the threading slider 16. The spindle 11 and the bearings 12 and 13 are prevented from moving endwise by an adjusting nut 20, which is screw threaded on the upper end of the spindle. The threading slider 16 is operated by means of a cam, a portion of which is shown at 21, upon which cam rides a roller 22, which roller is carried by a pin mounted in the slider 16. A protecting plate 23 closes up the end of the bearings. It will be noted that the threading die head is mounted as close up to the taper bearing 12 as possible and that the threading slider 16 extends under and nearly to the end of the threading die head as best shown in Fig. 2. One important advantage of this arrangement of the threading slider resides in increased stability in operation in contra-distinction to existing machines, in which the spindles are advanced to such an extent beyond their bearings that the overhang puts an excessive load upon the bearings. With the structure just described, the bearings are mounted in the threading slider and are advanced with the spindle and the slider, so that there is no destructive overhang of the threading die head.

In the form illustrated the die head is of the type in which the threading cutters are opened by pulling the front unit axially and as shown, a screw 24 is positioned to stop the forward axial travel of the slider, at which time the forward unit of the die head is pulled axially to cause the thread cutters to open. The screw 24 may be adjusted axially to determine the position at which the die head will be caused to collapse. An arm 25 is pivoted at 26 to a yoke bracket 27. Suitable means may be provided for rocking the shaft 26 to swing the arm 25 to close the die head upon its return from threading operation, as is more fully described in the co-pending application above referred to.

It is well known that a skilled mechanic can produce very accurate threads on a hand operated machine by applying the right amount of pressure to start the threading die head on the work, quickly reducing the pressure the right amount as the threading head advances and removing all pressure as soon as the threading die head has advanced sufficiently to lead the die head on the work In mechanical devices heretofore used for producing the necessary pressure upon the threading die head to feed the head upon the work, a spring has been used to duplicate the action of the operator just described. One defect in known devices for this purpose lies in the fact that the single spring heretofore used had to be made longer than the ideal spring, in order to permit moving the threading die head away from the end of the work far enough to permit the die head to close. A spring of the necessary length could not be adjusted so as to give the correct pressure during the entire period of its action. For example, suppose that it is necessary to retract the threading cutters ⅝ of an inch beyond the end of the work to close the die head, and that one hundred pounds pressure is necessary to start the threading die head on the work, and that when the threading die head has advanced on the work for ⅛ inch the pressure should drop to twenty pounds. It is practically impossible to make a spring which would vary from twenty to one hundred pounds in a compression of ⅛ of an inch, and still keep within a reasonable tension, or within the elastic limit of the material when the spring is compressed another ⅝ inch. In my device, I avoid this difficulty by using a long spring 29 to take care of the overtravel of the threading slider, necessary to close the die head, and use a separate short spring 30 to feed the threading die head on the work. It will readily be seen that a spring can be made to give the desired starting pressure and have just the right number of coils, so that it will lose its pressure as quickly as desired as the the threading die head advances. The springs 29 and 30 are carried by the threading slider 16. The spring 29 is mounted in a sleeve 31 which is provided with a shoulder 32 which limits or stops the action of the spring 29, the sleeve 31 being free to slide in the threading slider 16, and in a gear cover 33 which is bored to receive it. An adjusting screw 34 is provided so that the tension of the spring 29 may be regulated as desired. The adjusting screw 34 is carried by a bracket 35 attached to the threading slider 16. The adjusting screw may be locked by a lock screw 36. The spring 30 is mounted outside of the sleeve 31 and surrounds a push rod 37. The push rod is free to slide in the sleeve, and in the adjusting screw 34. Adjusting nuts 38 may be used to very the tension of the spring 30 and similar adjusting nuts 39 on the lower end of the push rod 37 may be used to limit the action of the spring 30. A bracket 40 is attached to the main casing 17 and is stationary with respect to the threading slider 16. On the return stroke of the threading slider the push rod 37 comes into contact with the bracket 40, compressing the springs 30 and 29, as best shown in Fig. 2.

The operation of the feeding means just described is as follows: Assume the parts in the position to permit the die head to close and the springs 29 and 30 are under tension. The upper end of the rod 37 has engaged the arm 40 which stopped upward movement of this rod and the springs were put under tension since the lower end of the spring 29 is seated against the adjusting screw 34. The sleeve 31 at this time is free to slide in the portion 33 of the slider so that springs 29 and 30 are under the same tension. The threading slider is now moved toward the work under the tension of these springs which act together as a single spring. As soon, however, as the portion 33 of the slider is carried down far enough to engage the shoulder 32 the spring 29 can no longer expand. This spring is now held between the upper end of the sleeve 31 and the upper end of the adjusting screw 34. Spring 30, however, continues to exert downward pressure on the top of the sleeve 31 to move the threading slider downwardly. The parts are so adjusted that the shoulder 32 engages the portion 33 of the slider just as the threading die head is brought into contact with the work. Since spring 29 can no longer expand the force exerted upon the threading die head results from the expansion of the spring 30. This is a very short spring so that during slight expansion its tension will drop very rapidly. As an illustration this tension may be such as to exert 80 pounds pressure when the die head engages the work and so that its tension will drop to approximately 20 pounds pressure in expanding one eighth of an inch. It soon expands its maximum so that for the remaining threading action the die head is moved by the threads on the work and not by spring action at all. From the foregoing it will be apparent that during a part of the movement of the threading slider springs 29 and 30 act as a single spring but during the time in which the die head is beginning threading action the spring 30 acts alone.

As an object of my machine is to secure accurately cut threads and as the pitch of the threads cut is one of prime importance it is obvious that there should be no excessive pressure on the lead nut, formed by the thread cutting chasers. In this connection I provide novel means to limit and control the pressure. To reduce the sliding frictional resistance of the driving member for revolving the die head, I employ a gear 46 having a face of sufficient width to be fully engaged with gear 44, during the entire movement of the threading slider, so that the sliding action against the driving pressure is reduced considerably, due to the increased diameter of the driving member, and that the driving member is revolving, as compared with existing machines of the type similar to one outlined in this application. Furthermore the threading slider 16 is mounted on vertical or semi-vertical bearings so that the weight of the threading slider and die head 10 would overcome the sliding frictional resistance of driving the die head, and the slider sliding on its bearings. To control this advance of the threading unit and to apply some resistance to the thread cutting chasers when desired, I have counterbalanced the threading slider and have provided a number of counterbalanced wafers so that the pressure on the thread cutting chasers can be controlled to a nicety.

A boss 45 on the threading slider is drilled and slotted to receive one end of the cable 42 which passes over a sheave 43 that is carried by the main casting, Fig. 1. The other end of the cable 42 is fastened into a sheave 47 carried by the main casting. Another cable 48 has one end fastened to a sheave 49 and to the other end is fastened a balance weight 50. Balance weight wafers 51 are attached to the balance weight. The number of wafers 51 can be varied to suit the various conditions met in machines of this nature.

The operation of the mechanism described is as follows: Assume the die head to be in its rearmost position, (as shown in Fig. 2). Upon further rotation of the cam 21 the cam 21 runs away from the roller 22, but the compression of springs 30 and 29 through the medium of the push rod 37 pressing against the bracket 40 forces the threading slider 16 toward the work, keeping the roller 22 in contact with the cam 21 until the thread cutting tools just about touch the work. At this time the edge 41 on the threading slider will come in contact with the shoulder 32 on the sleeve 31, stopping the action of the spring 29. As the cam continues to revolve the short starting spring 30 will force the thread cutting tools upon the work. The roller 22 will leave the cam 21 as the angle of the cam is made greater than any angle that the cam roller will advance through, regardless of the length of the lead of the thread. As the thread cutting tools advance, the pressure of spring 30 falls very rapidly, and when the thread cutting tools have advanced a distance sufficient for the threads to lead the die head on the work the end of adjusting screw 34 comes into contact with the stop unit 39, stopping the action of the spring 30 on the threading cutters and the threading slider 16. As the threading slider 16 continues to advance, the rod 37 and its component parts lose their independent movement and travel with the threading slider 16. Upon the completion of the movement of the threading slider 16 necessary to cut the thread, threading slider 16 is withdrawn to its rearmost position, as shown in Fig. 2, by the action of the cam 21 against the roller 22. This rearward movement brings the rod 37 into contact with the bracket 40, compressing the springs 30 and 29 and placing the rod 37 and its component parts in operative position for a second threading operation.

While I have preferred to show the device in a vertical or semi-vertical position I do not limit myself to this manner of mounting it.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. In a threading machine having a threading head, means for bringing said head to the work and starting said head upon the work, comprising resilient means, means for stopping a portion of said resilient means as soon as said head reaches the work, the remaining portion of said resilient means continuing to operate to move said head upon the work and means for stopping said remaining portion as soon as said head has cut sufficient threads to cause said head to be controlled in its movement by said threads, substantially as set forth.

2. In a machine for threading work having a threading head, the threading head being mounted on a spindle, the spindle being mounted on a slider which is arranged to slide on slideways, means for imparting movement to the said slider comprising two springs arranged in axial alignment and adapted to impart movement to the slider to bring the threading head up to the work, means for putting one of said springs out of action as soon as the die head reaches approximately the point of beginning the threading of the work, the other of said springs continuing to operate to impart movement to the slider to start the threading die head upon the work, and means for putting the last named spring out of action as soon as the die head has cut enough thread for the threads to lead the die head through the remaining action of threading the work, substantially as set forth.

3. A device for starting a threading die head upon the work comprising two springs operable as a single spring to bring the die head to the work, means for putting one of said springs out of action as soon as the die head reaches the work, the other continuing to move the die head for starting it upon the work, and means for putting said last named spring out of action when enough thread has been cut to make the die head self leading, substantially as set forth.

4. In a machine for threading work having a threading die head and work holding means, the said threading die head being mounted in an oblique position and balanced, and means for moving the die head upon the work comprising two springs operable to impart the movement for bringing the die head to the work, means for stopping the action of one spring as soon as the die head reaches the work and for stopping the action of the other spring as soon as the die head has cut sufficient thread to be self leading, substantially as set forth.

5. A machine for threading work comprising a threading head, work holding means, means for driving the threading head comprising a spindle having a threading head mounted thereon, a driven gear mounted on said spindle, a driving gear meshing with the driven gear, said driven gear being of sufficient width to engage said driving gear throughout the axial movement of the head, means for starting the threading die head upon the work comprising two springs operable as a unit to bring the die head to the work, means for putting one of said springs out of action as soon as the die head reaches the work, the other of said springs operating to impart movement for starting the die head on the work, and means for putting the last named spring out of action when sufficient thread has been cut to lead the die head through further threading of the work, substantially as set forth.

6. In a threading machine of the kind described having a threading die head, means for moving the threading die head upon the work comprising the combination with a threading slider of resilient means for moving said slider toward the work, said resilient means acting in its entirety to bring the threading die head to the work, means for putting a part of the resilient means out of action when the die head reaches the work, the remaining part operating for moving the die head upon the work, and means for putting said remaining part out of action as soon as the die head has cut sufficient thread to be self leading, substantially as set forth.

7. In a screw threading machine having a die head, the die being mounted on a slider, means for starting the die head on the work comprising two springs, said springs acting as a single spring to bring the die head to the work, means for stopping the action of one spring before the die head engages the work, and means for stopping the action of the other spring as soon as the die head has engaged the work sufficiently to make it self leading, substantially as set forth.

8. A device for starting a threading die head upon the work comprising two springs in axial alignment with each other and operating as a single spring to bring the die head to the work, means for putting one of said springs out of action as soon as the die head has reached the work, the other spring operating to start the die head on the work, and means for putting the last named spring out of action as soon as the threads on the work have been cut sufficiently so as to act as a lead for further feeding the die head on the work, substantially as set forth.

9. Means for moving a threading die head upon the work comprising in combination a threading slider, a bracket attached to said slider, a rod slidably carried by the said bracket, a sleeve mounted on said slider, a relatively long spring in said sleeve surrounding said rod, a relatively short spring surrounding said rod outside of said sleeve, the said short spring having one end in engagement with the sleeve, a stationary bracket, one end of said rod being adapted to abut against said stationary bracket to compress said springs upon movement of said slider from the work, said springs bringing their combined tension against the threading slider to return the die head to the work, the longer of said springs becoming ineffective as the threading die head reaches the work so that the short spring alone acts to move the head to begin cutting threads on the work, substantially as set forth.

10. Means for moving a threading die head upon the work comprising in combination a threading slider, a bracket attached to said slider, a rod slidably carried by the said bracket, a sleeve mounted on said slider, a relatively long spring in said sleeve surrounding said rod, a relatively short spring surrounding said rod outside of said sleeve, the said short spring having one end in engagement with the sleeve, a stationary bracket, one end of said rod being adapted to abut against said stationary bracket to compress said springs upon movement of said slider from the work, said springs bringing their combined tension against the threading slider to return the die head to the work, the longer of said springs becoming ineffective as the threading die head reaches the work so that the short spring alone acts to move the head to begin cutting threads on the work, said short spring expending its tension during the cutting of enough thread to serve as a lead to move the die head upon the work without pressure of said spring, substantially as set forth.

In witness whereof, I have hereunto set my hand at Waynesboro, Pennsylvania, this 5th day of July, A. D. nineteen hundred and twenty-nine.

SAMUEL W. MATHIAS.